UNITED STATES PATENT OFFICE.

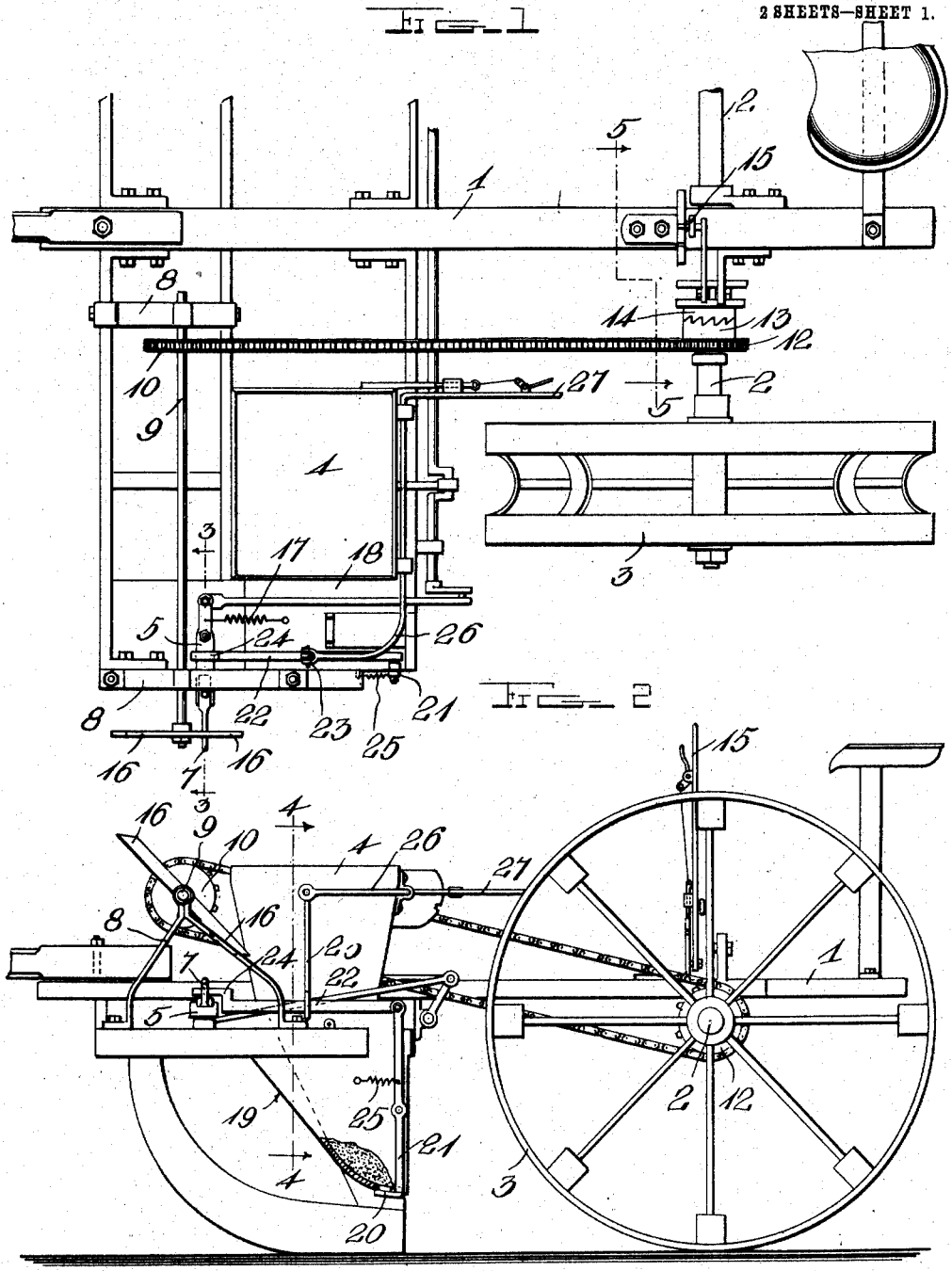

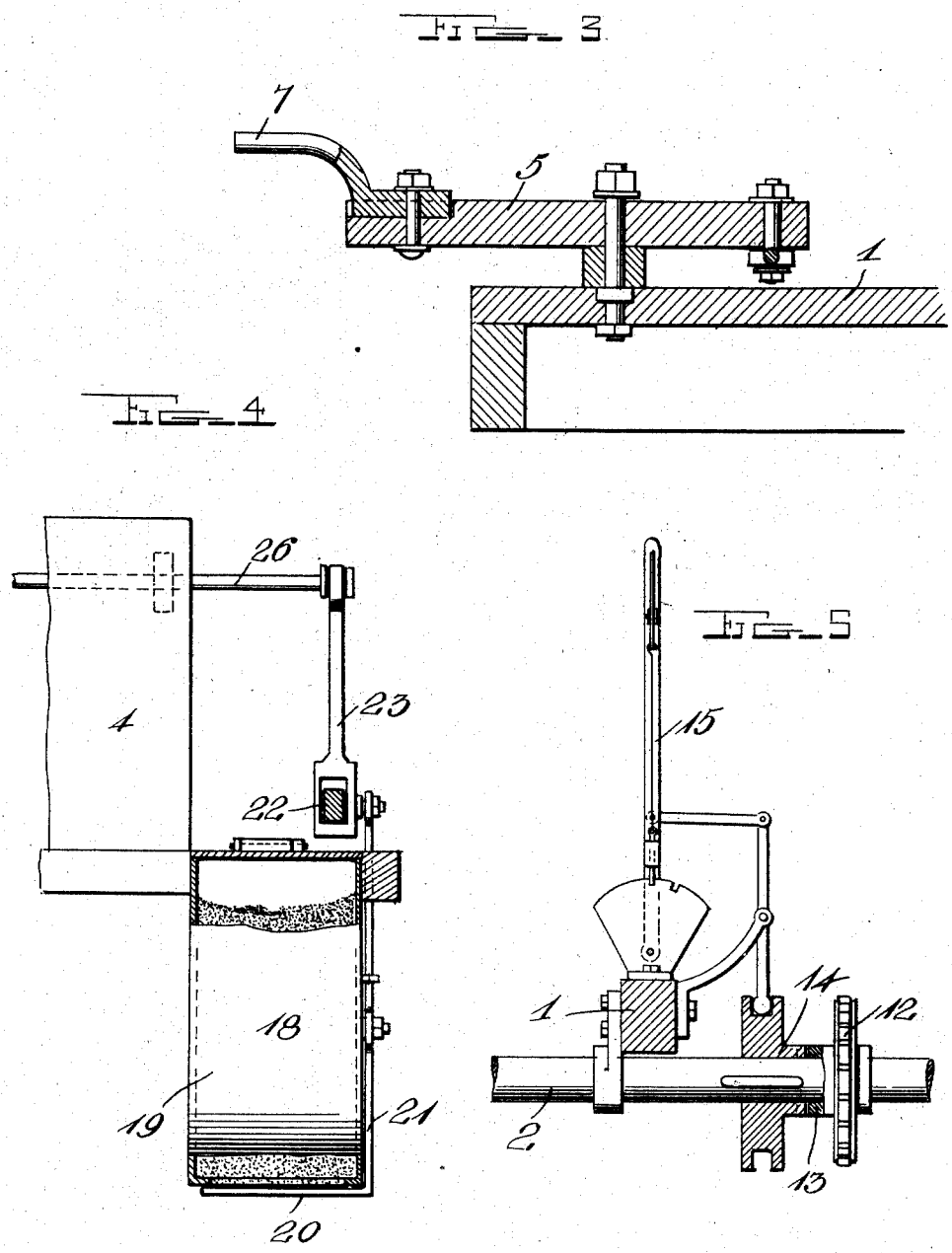

FRED FISHER, OF IRONTON, MISSOURI, ASSIGNOR TO HERMAN F. LOTZ, OF IRONTON, MISSOURI.

ATTACHMENT FOR CORN-PLANTERS.

No. 927,518.        Specification of Letters Patent.        Patented July 13, 1909.

Application filed February 11, 1909. Serial No. 477,358.

*To all whom it may concern:*

Be it known that I, FRED FISHER, a citizen of the United States, residing at Ironton, in the county of Iron and State of Missouri, have invented certain new and useful Improvements in Attachments for Corn-Planters; and I do declare the following to be a full, clear, and exact description of the invention, such as will enable others skilled in the art to which it appertains to make and use the same.

This invention relates to improvements in feed operating and marking attachments for corn planters.

The object of the invention is to provide a marking attachment and a grain discharging mechanism for corn planters and means for intermittently operating both the marking attachment and the grain discharging mechanism.

A further object is to provide means whereby the marking attachment may be thrown out of operation.

With the foregoing and other objects in view, the invention consists of certain novel features of construction, combination and arrangement of parts as will be more fully described and particularly pointed out in the appended claims.

In the accompanying drawings, Figure 1 is a plan view of a corn planter showing the application of the invention thereto; Fig. 2 is a side view of so much of the planter as is necessary to show the application of the invention; Fig. 3 is a vertical sectional view on the line 3—3 of Fig. 1; Fig. 4 is a vertical transverse sectional view taken on line 4—4 of Fig. 2; and Fig. 5 is a transverse sectional view taken on line 5—5 of Fig. 1.

Referring more particularly to the drawings, 1 denotes the planter frame, 2 denotes the axle upon which the frame is mounted and 3 denotes the supporting wheels. On the forward portion of the frame 1 is arranged the grain hoppers 4 in which are suitable discharge valves, not shown. To the valves of the grain hoppers is connected an operating bar 5 which is pivotally mounted on the frame of the planter, as shown. On the outer end of the bar 5 is detachably secured a trip finger 7 which projects beyond the side of the planter, as shown.

Mounted in suitable bearing brackets 8 on the front end of the frame 1 is a trip operating shaft 9 on which is fixedly mounted a sprocket wheel 10. The sprocket wheel 10 is connected to a sprocket wheel 12 loosely mounted on the axle of the planter. The sprocket wheel 12 is provided with one member 13 of a clutch, the opposite member 14 of which is slidably keyed to the axle to turn therewith and is adapted to be thrown into engagement with the clutch member 13 of the sprocket wheel 12 by means of a shifting lever 15 arranged in convenient reach of the driver. When the sprocket wheel 12 has been thus connected to the axle, the movement of the latter will be imparted to the shaft 9. On the outer end of the shaft 9 is fixedly mounted oppositely projecting trip arms 16 which when the shaft 9 is revolved as hereinbefore described will be brought into consecutive engagement with the trip finger 7 on the valve operating bar 5 thus tripping or throwing said bar in one direction to cause the same to operate the valves in the grain hoppers and in the marking hopper. To the operating bar 5 is connected a retracting spring 17 whereby said bar is retracted to a normal position after being tripped by the trip arms 16.

Secured in any suitable manner to one side of the planter frame is a supplemental hopper 18, said hopper being provided with an inclined side or bottom 19 whereby the contents will be discharged therefrom when the valve therein is opened.

The hopper is arranged so that the discharge end is in line with the drill tubes of the grain hoppers whereby the marking material contained in the hopper 18 will be discharged opposite the hills in which the grain is dropped.

The discharge end of the supplemental hopper is closed by a valve 20 which is connected to an operating lever 21 pivoted on one side of the hopper and loosely connected at its upper end to an operating bar 22 which is slidably mounted in a hanger 23 and is provided on its outer end with an off-set finger 24 which projects over the operating bar 5 of the grain hoppers, said bar engaging the end of the operating bar 22 when tripped or rocked by the trip arms 16 thus shifting the valve 20 and opening the discharge end of the supplemental hopper. Connected to the lever 21 is a retracting spring 25 by means of which the lever 21 and the valve 20 are retracted to close the discharge opening of the hopper after the same has been opened by the trip mechanism.

The hanger 23 which supports the outer portion of the operating bar 22 is suitably connected to the outer end of a crank rod 26, the opposite end of which is connected to an operating lever 27 arranged within convenient reach of the driver whereby said crank rod may be operated to raise the hanger 23 and the other end of the bar 22, thus disengaging the outer end of said bar, or raising the same out of the line of movement of the valve operating bar 5, thus preventing said bar from operating the valve of the supplemental hopper. Any suitable material may be used for marking the hills but I preferably employ slaked-lime for this purpose.

By means of an attachment such as shown herein and described, the valves of the grain hoppers and the valve of the supplemental hopper may be operated in a reliable and efficient manner, and the use of a check line dispensed with.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim as new and desire to secure by Letters-Patent is:

1. An attachment for corn planters comprising a pivoted valve operating bar provided at one end with a trip finger, a crank shaft mounted in the frame of the machine and connected with the hopper valves, a crank and link connection between the operating bar and said crank shaft, an operating shaft mounted in the frame and provided at one end with a plurality of trip fingers adapted to successively engage the finger of the operating bar and means under control of the operator for throwing the operating shaft into and out of gear.

2. An attachment for corn planters comprising a pivoted valve operating bar, a connection between said bar and the valve of the adjacent hopper, a trip finger at the outer end of said bar, an operating shaft mounted in the frame of the corn planter, a plurality of trip fingers arranged at one end of said shaft to successively engage the finger of the operating bar, a supplemental hopper arranged near the feed hopper, a valve for said supplemental hopper, an operating bar to operate said valve, said bar having an operating finger projecting over the operating bar, and means under the control of the operator for raising or lowering said bar to bring its finger into or out of the path of the valve operating bar.

In testimony whereof I have hereunto set my hand in presence of two subscribing witnesses.

FRED FISHER.

Witnesses:
J. L. CONWAY,
LOTTIE L. PRINCE.